United States Patent [19]

Miyano et al.

[11] Patent Number: 4,854,271
[45] Date of Patent: Aug. 8, 1989

[54] INTAKE MANIFOLD ASSEMBLY FOR ENGINES

[75] Inventors: Hideyo Miyano; Yasuo Kitami, both of Saitama, Japan

[73] Assignee: Honda Giken Kogyo Kabushiki Kaisha, Tokyo, Japan

[21] Appl. No.: 287,679

[22] Filed: Dec. 20, 1988

Related U.S. Application Data

[63] Continuation of Ser. No. 904,924, Sep. 8, 1986, abandoned.

[30] Foreign Application Priority Data

Sep. 9, 1985 [JP] Japan ................ 60-199073

[51] Int. Cl.$^4$ ................ F02B 75/22; F02M 35/10
[52] U.S. Cl. ................ 123/52 MV; 423/52 MB
[58] Field of Search ......... 123/52 M, 52 MV, 52 MB, 123/52 MC

[56] References Cited

U.S. PATENT DOCUMENTS

| | | | |
|---|---|---|---|
| 2,835,235 | 5/1958 | Gassmann et al. | 123/52 M |
| 4,617,897 | 10/1986 | Sasaki et al. | 123/52 MB |
| 4,669,428 | 6/1987 | Ichida et al. | 123/52 MB |
| 4,726,329 | 2/1988 | Atkin | 123/52 MV |

FOREIGN PATENT DOCUMENTS

| | | |
|---|---|---|
| 0060258 | 4/1985 | Japan . |
| 0069254 | 4/1985 | Japan . |
| 0138265 | 7/1985 | Japan . |
| 0147531 | 8/1985 | Japan ................ 123/52 M |

Primary Examiner—Willis R. Wolfe
Assistant Examiner—M. Macy
Attorney, Agent, or Firm—Lyon & Lyon

[57] ABSTRACT

An intake manifold assembly of a variable intake passage length includes a branch passage body for introducing air from a main throttle valve into intake ports of an engine. The branch passage body has an intake chamber communicating with the main throttle valve, a plurality of shorter passages extending upwardly from the intake chamber and each having an auxiliary throttle valve for selectively opening and closing the shorter passage, a plurality of longer passages extending from the intake chamber around a lower side of the intake chamber, the shorter and longer passages having downstream ends joined to each other at respective junctions, and connected to the intake ports. The branch passage assembly comprises an upper member, a lower member, and an intermediate member sandwiched between the upper and lower members, the intake chamber being defined in the lower member, the shorter passages being defined in the upper and intermediate member, the longer passages being defined in the upper, intermediate, and lower member, a connection to the intake ports being defined in the upper member, the auxiliary throttle valves being angularly movably disposed respectively in the shorter passages in the intermediate member.

9 Claims, 4 Drawing Sheets

INTAKE MANIFOLD ASSEMBLY FOR ENGINES

This application is a continuation of application Ser. No. 904,924, filed 9/8/86, now abandoned.

BACKGROUND OF THE INVENTION

The present invention relates to an intake manifold assembly for use with an engine, and more particularly to an intake manifold assembly having a variable intake passage length for use with an automotive engine.

Intake manifolds for engines are generally disposed between the intake ports of a cylinder head and a carburetor or throttle body having a throttle valve for controlling the amount of intake air. The intake manifold has as many branch passages as the number of intake ports to distribute the air into the intake ports. To meet the demand for higher engine power output without increasing engine displacement size, there has recently been proposed an intake manifold system of a variable intake passage length as disclosed in U.S. patent application Ser. No. 647,713, filed Sept. 5, 1984 corresponding to Japanese Patent Application No. 58(1983)-248657, now U.S. Pat. No. 4,669,428. According to that proposed intake manifold system, the effective intake passage length is reduced when the engine rotates at a high speed or operates under a high load. With that intake manifold system, the charging efficiency of the engine is increased over a full engine operation range for improved engine output performance.

More specifically, the previously proposed intake manifold system includes longer intake passages and shorter intake passages extending parallel thereto and having auxiliary throttle valves or bypass valves which will be opened when the engine rotates at a high speed or operates under a high load and closed at low engine speed or load, to thereby selectively connect the longer and shorter intake passages to the intake ports of the engine. At a lower engine speed or a lower engine load, the air is introduced through the longer intake passages into the intake ports. At a higher engine speed or a higher engine load, the bypass valves are open to allow the air to pass through the shorter intake passages into the intake ports. Therefore, when the engine operates at a lower speed or load, the air mixture is fed efficiently and effectively under its inertia developed during travel through the longer intake passages. When the engine operates at a higher speed or load, the air supplied through the shorter intake passages is subjected to a smaller degree of resistance. Thus, the charging efficiency of the engine is increased at higher and lower engine speeds or loads, resulting in improved engine power output.

However, the intake manifold system of the above structure has a relatively complex passage arrangement, and is large in size especially where an intake chamber of a relatively large volume is employed as a surge tank. If the intake manifold system is to be associated with an automotive engine, it has been found difficult to provide sufficient space for installing the intake manifold system in the engine compartment in the automobile.

SUMMARY OF THE INVENTION

It is an object of the present invention to provide an intake manifold assembly for use with engines which is of the variable intake passage length type including a plurality of intake passages of different lengths and which is of a relatively small size.

According to the present invention, there is provided an intake manifold assembly for use with an engine including intake ports, comprising a branch passage body for introducing air from an upstream end to a downstream end thereof, the branch passage body being adapted to be connected at the downstream end to the intake ports and at the upstream end to a main throttle valve for controlling air drawn into the branch passage body. The branch passage body has an intake chamber at the upstream end, adapted to communicate with the main throttle valve, a plurality of shorter passages extending upwardly from the intake chamber and each having an auxiliary throttle valve for selectively opening and closing the shorter passage, a plurality of longer passages extending from the intake chamber around a lower side of the intake chamber, the shorter and longer passages having downstream ends joined to each other at respective junctions, and a plurality of intake passages extending downstream from the junctions, respectively, and adapted to be connected to the intake ports.

The branch passage body comprises a first member defining at least a portion of the longer passages and the intake chamber, and a second member having at least the intake passage, the first and second members being vertically stacked one on the other.

With this arrangement, the intake manifold assembly of a variable passage length can have passages of different lengths without increasing the dimensions of the intake manifold assembly along the crankshaft.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
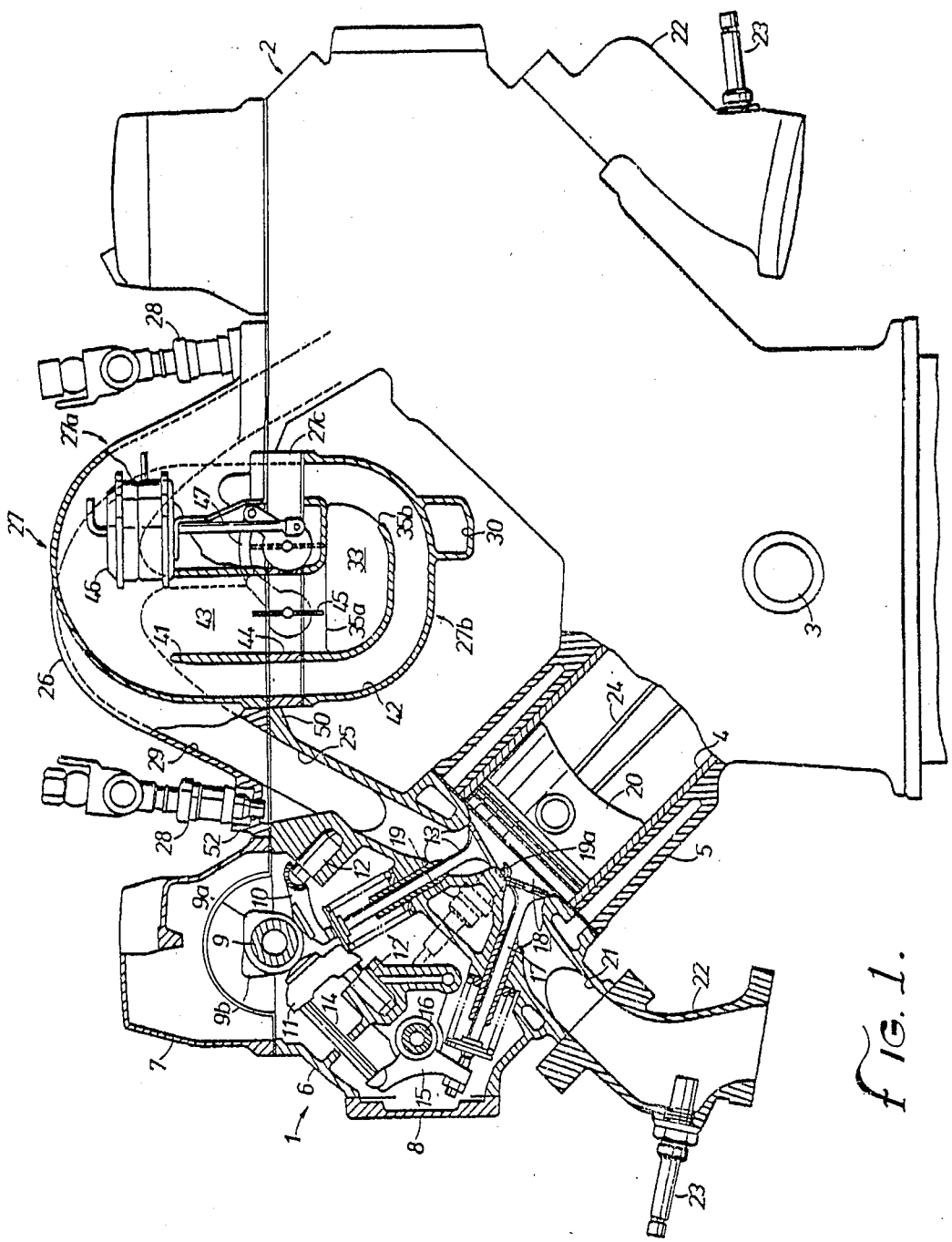
FIG. 1 is a front elevational view, partly in vertical cross section, of an engine incorporating an intake manifold assembly according to the present invention.

FIG. 1 shows a V6 internal combustion engine which incorporates therein an intake manifold assembly of the present invention. The engine preferably includes four valves for each engine cylinder although only two valves are visible in FIG. 1. The engine includes two cylinder arrays or banks 1, 2 of identical construction which are angularly spaced at a bank angle of 90 degrees in a V shape. Each of the cylinder banks 1, 2 comprises a cylinder block 5 having three cylinders 4 (only one shown) defined therein at spaced intervals along the axis of a crankshaft 3. The engine also includes a pair of cylinder heads 6 fixed to the upper ends of the cylinder blocks 5, respectively. Each of the cylinder heads 6 has openings defined in upper and lateral sides that are closed by a cam cover 7 and a rocker arm cover 8, respectively.

A camshaft 9 is rotatably disposed in the cylinder head 6 and covered with the cam cover 7, the camshaft 9 being operatively coupled to the crankshaft 3 through timing pulleys and a timing belt (not shown). The camshaft 9 has a plurality of pairs of cams 9a, 9b spaced at intervals therealong, the cams 9a, 9b in each pair being held in sliding engagement with first and second rocker arms 10, 11, respectively.

The first rocker arm 10 has one end pivotally supported on a hemispherical head of a hydraulic tappet or lash adjuster 12. The opposite end of the first rocker arm 10 engages an end of an intake valve 13 which is normally spring-biased in a direction to close an intake port associated with the intake valve 13. The second rocker arm 11 has one end pivotally supported on a hemispherical head of a hydraulic tappet or lash adjuster 12'. The opposite end of the second rocker arm 11 is operatively coupled by a pusher rod 14 to one end of a third rocker arm 15 so that angular movement of the second rocker arm 11 can be transmitted to the third rocker arm 15 through the pusher rod 14. The third rocker arm 15 is angularly movably supported by a rocker shaft 16. The opposite end of the third rocker arm 15 is held in engagement with an end of an exhaust valve 17 that is normally spring-biased in a direction to close an exhaust port associated with the exhaust valve 17.

As the camshaft 9 is rotated about its own axis by the crankshaft 3, the intake and exhaust valves 13, 17 are opened and closed at prescribed timing to introduce an air-fuel mixture into a combustion chamber 18 and discharge an exhaust gas from the combustion 18. Each engine cylinder 4 has two pairs of the intake and exhaust valves 13, 17, but only one pair is shown in FIG. 1.

A spark plug 19 is threadedly mounted centrally in each cylinder 4 of the cylinder head 6. The spark plug 19 has a side electrode 19a projecting into the combustion chamber 18, which is defined between the upper end surface of a piston 20 slidably disposed in the cylinder 4 and the lower surface of the cylinder head 6.

An exhaust manifold 22 is attached to the outer ends of exhaust ports 21 communicating with the combustion chambers 18 through the exhaust valves 17. The exhaust manifold 22 is connected to a muffler (not shown) to discharge the exhaust gas through the muffler into the atmosphere. An $O_2$ sensor 23 is threadedly mounted on the exhaust manifold 22 for detecting the density of oxygen contained in the exhaust gas as it flows through the exhaust manifold 22. A signal indicative of the oxygen density is fed from the $O_2$ sensor 23 back to a controller (not shown) which controls the amount of fuel injected according to the amount of intake air in order to achieve a stoichiometric air-fuel ratio.

The piston 20 is operatively coupled to the crankshaft 3 by a connecting rod 24 which converts reciprocating movement of the piston 20 produced under the pressure of fuel combustion into rotation of the crankshaft.

As thus far described, the engine is relatively conventional and does not comprise a part of the present invention.

The cylinder head 6 has an upper surface lying flush with the upper surface of a flange 50 in which there are defined intake ports 25 communicating through the intake valves 13 with the combustion chambers 18. A branch passage body 27 having an intake pipe 26 communicating with each of the intake ports 25 is mounted on the upper surface of the flange 50 by means of bolts 51 (FIG. 2) that are threaded downwardly into the flange 50. The branch passage body 27 has flanges 52 located near the joints between the intake pipes 26 and the intake ports 25. Fuel injection nozzles 28 are mounted on the flanges 52 and have fuel outlet ports directed downwardly toward the respective intake ports 25.

Figure 3:
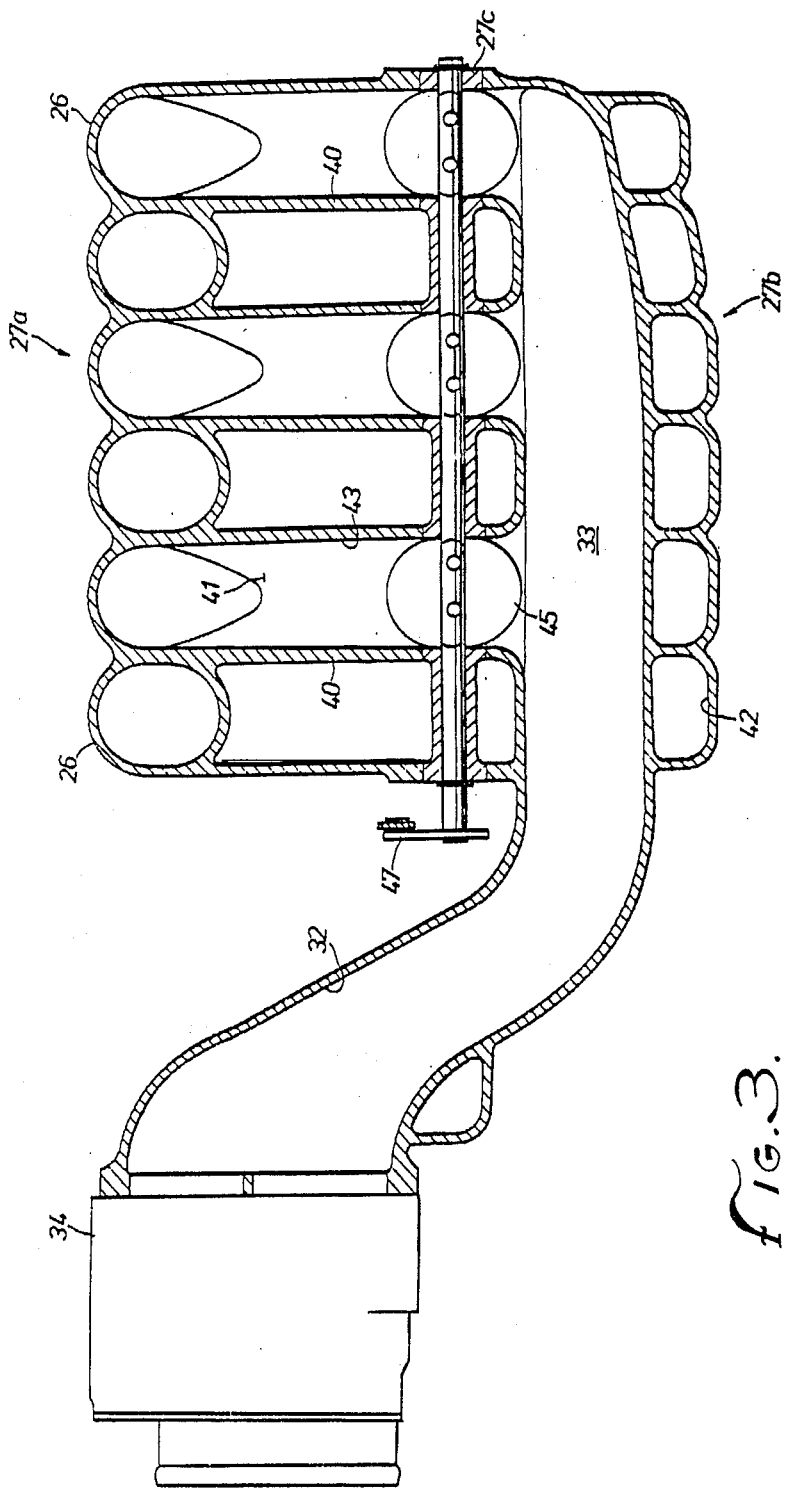
FIG. 3 is a cross-sectional view of the intake manifold assembly taken along line III—III of FIG. 2.
Figure 4:
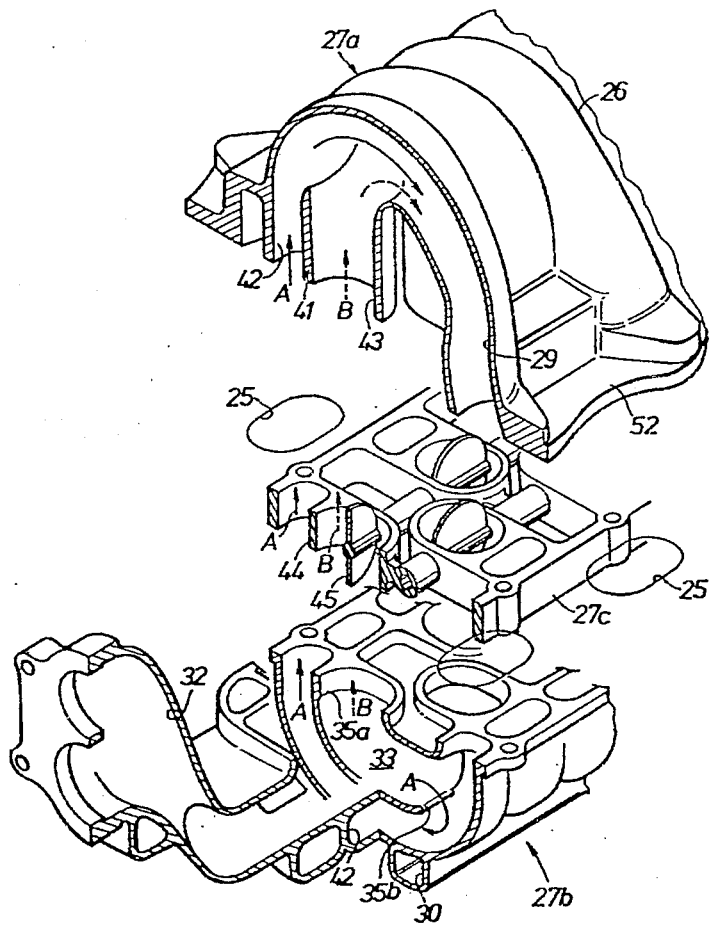
FIG. 4 is a fragmentary exploded perspective view, partly cut away, of the intake manifold assembly illustrated in FIG. 1.

As shown in FIGS. 1, 3, and 4, the branch passage body 27 comprises an upper member 27a, a lower member 27b, and an intermediate member 27c sandwiched between the upper and lower members 27a, 27b and fastened by bolts into a unitary assembly. The upper, intermediate, and lower members 27a, 27b, 27c are in the form of hollow members which are separately cast.

The upper member 27a is divided into separate sections by pipe walls 40 of the intake pipes 26 which have upper arcuately curved portions. The divided sections of the upper member 27a have intake passages 29 defined in downstream portions thereof and extending downwardly. The intake passages 29 are alternately connected to the intake ports 25 of the cylinders 4 in the cylinder banks 1, 2. The divided sections of the upper member 27a also include downstream ends of longer and shorter passages 42, 43 defined by partitions 41 extending transversely to the pipe walls 40.

The intermediate member 27c includes partitions 44 which define middle portions of the longer and shorter passages 42, 43. The middle portions of the shorter passages 43 can be opened and closed by auxiliary throttle valves 45 angularly movably supported in the intermediate member 27c.

As better shown in FIG. 3, the lower member 27b has an intake chamber 33 defined centrally therein and shared by all of the cylinders 4. The intake chamber 33 is in the form of an elongate chamber extending along the direction of the crankshaft 3 and has a volume large enough to eliminate intake air pulsations. The intake chamber 33 is connected to a throttle body 34 by an upstream intake passage 32 inclined upwardly toward an upstream end thereof which is joined to the throttle body 34. A water passage 30 extending along the crankshaft 3 is defined on the lower surface of the bottom wall of the lower member 27b for the passage of an engine coolant therethrough to heat the air that is drawn into the intake chamber 33.

As illustrated in FIGS. 1 and 4, the lower member 27b has openings 35a defined in an upper wall thereof in communication with the intake chamber 33 and associated with the respective cylinders 4, and openings 35b defined in a side wall thereof in communication with the intake chamber 33 and associated with the respective cylinders 4. The upper openings 35a communicate respectively with the upstream ends of the shorter passages 43, whereas the side openings 35b communicate respectively with the upstream ends of the longer passages 42 which extend around the lower side of the intake chamber 33.

The shorter passages 43 having the respective auxiliary throttle valves 45 therein extend as straight vertical passages, through which the upper openings 35a of the intake chamber 33 communicate with the intake passages 29, respectively. The longer passages 42 extend from the side openings 35b of the intake chamber 33 around the lower side of the intake chamber 33 and then upwardly parallel to the shorter passages 43 defined by the partitions 41, and are joined to downstream ends of the shorter passages 43 and the intake passages 29.

Figure 2:
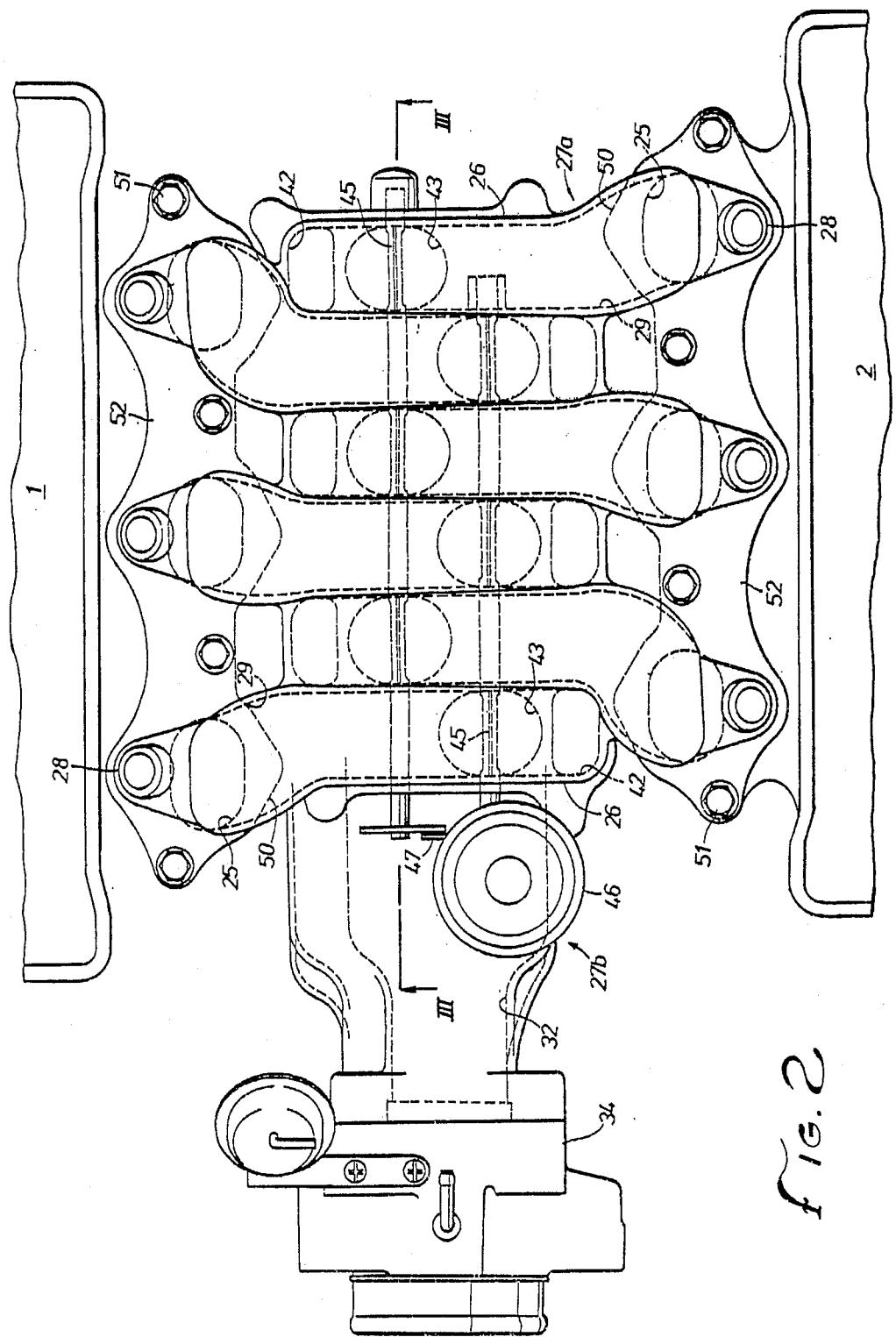
FIG. 2 is a plan view of the intake manifold assembly shown in FIG. 1.

The auxiliary throttle valves 45 can be driven by a dual diaphragm actuator 46 through a link mechanism 47 (FIGS. 1 and 2). The diaphragm actuator 46 is operated by the vacuum of intake air, and can provide two different strokes using a solenoid-operated valve (not shown) which is operated according to the opening of a main throttle valve (not shown) in the throttle body 34. Therefore, the auxiliary throttle valves 45 can be opened to two different degrees dependent on the condition in which the engine is operated.

Operation of the intake manifold assembly will be described with reference to FIG. 4.

When the engine operates at a lower speed or load, the auxiliary throttle valves 45 are fully closed by the actuator 46. The intake air which has been limited by the main throttle valve in the throttle body 34 is introduced from the intake passage 32 into the intake chamber 33 and then flows in the direction of the arrow A through the opening 35b, the longer passages 42, and the intake pipes 26 into the intake ports 25, from which the air is drawn into the combustion chambers 18.

When the engine rotates in a medium speed range, the auxiliary throttle valves 45 are partly opened to allow a portion of the intake air to flow in the direction of the arrows B through the openings 35a, the shorter passages 43, and the intake passages 29 into the intake ports 25, whereas the remaining air flows in the direction of the arrow A through the opening 35b, the longer passages 42, and the intake pipes 26 into the intake ports 25.

When the engine operates at a higher speed or load, the auxiliary throttle valves 45 are fully opened to permit most of the intake air to flow in the direction of the arrow B through the openings 35a, the shorter passages 43, and the intake passages 29 into the intake ports 25 and then the combustion chambers 28.

The auxiliary throttle valve 45 controlled according to the condition in which the engine is operated serves to increase and reduce the inertial energy of and resistance to air drawn into the combustion chamber 48 for smoothing torques in a wider range.

With the intake manifold assembly thus constructed, the intake passage 32 between the main throttle valve in the throttle body 34 and the intake chamber 33 that serve as a surge tank can be of a desired length without excessively increasing the dimension of the assembly along the crankshaft 3 and without physical interference with accessories of the engine. The desired passage lengths for the longer and shorter passages 42, 43 can be obtained by stacking the upper, intermediate, and lower members 27a, 27c, 27b as a unitary assembly, and positioning the joint between the upper and intermediate members 27a, 27c to lie flush with the lower surfaces of the flanges 52 through which the downstream intake passages 29 pass. The branch passage body 27 of the above construction can easily be manufactured. The longer passages 42 can be placed in a small space as it extends around the intake chamber 33 which serves to eliminate intake air pulsations.

The relatively complex intake pipes of the intake manifold assembly can therefore be manufactured easily, and the desired passage lengths therefor can be accomplished in a compact arrangement. As a consequence, the engine associated with the intake manifold assembly of the present invention can be made small in size and designed for high performance. The intake manifold assembly is disposed in a space defined between the cylinder banks of the engine.

Although a certain preferred embodiment has been shown and described, it should be understood that many changes and modifications may be made therein without departing from the scope of the appended claims.

We claim:

1. An intake manifold assembly for use with an engine having at least one row of intake ports extending in a longitudinal direction, comprising: a branch passage body for conducting air from an upstream end thereof to a downstream end thereof, said branch passage body being adapted to be connected at said downstream end to each of the intake ports and at said upstream end to a main throttle valve for controlling air drawn into the branch passage body; said branch passage body having at said upstream end an intake chamber extending in the longitudinal direction along the row of intake ports, a plurality of shorter passages equal in number to the intake ports and extending upwardly from said intake chamber, each shorter passage having an auxiliary throttle valve mounted therein and separate from each longer passage for selectively opening and closing each said shorter passage for controlling air flow therethrough, a plurality of longer passages equal in number to the intake ports, each said longer passage extending from said intake chamber around a lower side of said intake chamber in a direction transverse to the longitudinal direction and upwardly to a location above said shorter passage, each said shorter and longer passage having downstream ends joined to each other at a junction and with a further passage extending from said junction in a direct line for a distance greater than the length of said shorter passage for connecting directly to an intake port for providing an air charging at the intake port.

2. An intake manifold assembly according to claim 1, wherein said branch passage body comprises a first member defining at least a portion of said transversely-directed longer passages and intake chamber, and a second member having at least a portion of said shorter passages, said first and second members being vertically stacked one on the other.

3. An intake manifold assembly according to claim 2, wherein said branch passage body further includes an intermediate member sandwiched vertically between said first and second members, said auxiliary throttle valves being mounted in said intermediate member.

4. An intake manifold assembly according to claim 1, for use with a V-shaped engine having a pair of cylinder banks with two rows of intake ports, wherein said branch passage body is adapted to be disposed in a space defined entirely between the cylinder banks and intake ports.

5. An intake manifold assembly according to claim 1, wherein said shorter passages extend from said intake chamber through upper openings and said longer passages extend from said intake chamber through side openings, said longer passages including portions extending around said lower side of said intake chamber and upwardly parallel to said shorter passages, said passages that extend from said junctions extending toward the valve ports of the cylinder banks in a direction transverse to the longitudinal direction.

6. An intake manifold assembly according to claim 1, wherein said branch passage assembly comprises an upper member, a lower member, and an intermediate member sandwiched between said upper and lower members, said intake chamber being defined in said lower member, said shorter passages being defined in said upper and intermediate members, said longer passages being defined in said upper, intermediate, and lower member, a connection to the intake ports passages being defined in said upper member, said auxiliary throttle valves being angularly movably disposed in said shorter passages in said intermediate member.

7. An intake manifold assembly according to claim 6, wherein said shorter passages extend from said intake chamber through openings defined in the upper portion of said lower member, and said longer passages extend from said intake chamber through side openings defined in said lower member, said longer passages including portions extending around said lower side of said intake chamber and upwardly parallel to said shorter passages, said longer passages being oriented in a direction transverse to the axis of the crankshaft.

8. An intake manifold assembly according to claim 6, wherein said lower member has a common intake passage defined at said upstream end of the branch passage body, said common intake passage communicating with said intake chamber and adapted to be connected to the main throttle valve.

9. An intake manifold assembly for use with an engine having intake ports in a row extending parallel to a crankshaft and a main throttle valve body, comprising, a passage body having an intake chamber for connecting to the main throttle valve body and receiving intake air, said intake chamber extending along the engine in a direction parallel to the crankshaft, said passage body having a separate passage outlet for connecting to each intake port, a plurality of shorter passages and longer passages in the passage body, each shorter passage extending vertically from said intake chamber, each longer passage extending laterally from one side of said intake chamber around and below said intake chamber and then vertically to a juncture with a shorter passage, said longer passages oriented in a direction transverse to the crankshaft, an auxiliary throttle valve in each shorter passage and separate from each longer passage for controlling the flow of intake air through each said shorter passage, said passage body having a charging passage extending from each juncture of a shorter passage and a longer passage in a direct line to a passage outlet for charging air into each intake port, said passage body including upper, intermediate and lower members joined at two parallel surfaces formed on said intermediate member, said upper member including said junctures and charging passages, said intermediate member including said shorter passages and a portion of said longer passages, and said lower member including said intake chamber and the portions of said longer passages extending around said intake chamber.

* * * * *